United States Patent
Lumbert

(10) Patent No.: US 7,413,650 B2
(45) Date of Patent: *Aug. 19, 2008

(54) MOBILE OR STATIONARY MODULAR SELF-CONTAINED DEHYDRATION TOILET, DEHYDRATION ENGINE, AND GRAY WATER RECOVERY SYSTEM

(76) Inventor: Steven Lumbert, P.O. Box 1031, Cape Canaveral, FL (US) 32920

( * ) Notice: Subject to any disclaimer, the term of this patent is extended or adjusted under 35 U.S.C. 154(b) by 0 days.

This patent is subject to a terminal disclaimer.

(21) Appl. No.: 11/739,960

(22) Filed: Apr. 25, 2007

(65) Prior Publication Data

US 2007/0187338 A1 Aug. 16, 2007

Related U.S. Application Data

(62) Division of application No. 10/904,234, filed on Oct. 29, 2004, now Pat. No. 7,211,187.

(51) Int. Cl.
*C02F 1/04* (2006.01)
*C02F 1/78* (2006.01)

(52) U.S. Cl. .................. 210/153; 210/178; 210/180
(58) Field of Classification Search ............... 4/320; 210/748, 153, 178, 180
See application file for complete search history.

(56) References Cited

U.S. PATENT DOCUMENTS

| 5,698,095 | A | * | 12/1997 | Kami ................. 210/173 |
| 5,881,475 | A | * | 3/1999 | Kishimoto et al. ........... 34/381 |
| 6,132,600 | A | * | 10/2000 | Marchesseault et al. ..... 210/143 |
| 7,211,187 | B2 | * | 5/2007 | Lumbert ................. 210/153 |

* cited by examiner

*Primary Examiner*—Walter D. Griffin
*Assistant Examiner*—Cameron J Allen
(74) *Attorney, Agent, or Firm*—Malin Haley DiMaggio Bowen & Lhota, P.A.

(57) ABSTRACT

A compact dehydration engine and method for treating human waste and gray water residual electro-coagulants that includes a heated waste dehydration chamber that has low energy consumption and low water consumption in use. The system can be employed in stationary or mobile platforms that include multiple toilets and gray water sources for reclamation.

11 Claims, 8 Drawing Sheets

MOBILE OR STATIONARY MODULAR SELF-CONTAINED DEHYDRATION TOILET, DEHYDRATION ENGINE, AND GRAY WATER RECOVERY SYSTEM

BACKGROUND OF THE INVENTION

1. Field of the Invention

A mobile or stationary modular, self-contained dehydration toilet and gray water recovery system and method that include a dehydration engine made part of the toilet or installed remotely for efficiently processing human waste from multiple toilets and used in conjunction with a mobile or stationary platform for the recovery and recycling of gray water.

2. Description of Related Art

Due to the global population growth and severe droughts causing water shortages, there is a critical demand to efficiently process human waste without using natural resources such as fresh water and/or electricity generated from burning oil or coal. Employing toxic chemicals is not a safe alternative. Another demand for efficient human waste treatment and gray water recovery is based on the extreme mobility of large numbers of people resulting from the movement of armies throughout the world, refugee camps, or during recovery from natural disasters. Low power consuming dehydration toilets and gray water recovery systems that are portable or stationary are desirable for solving the processing of human waste not only in industrialized countries but also in developing nations.

Many types of portable toilets are shown in the prior art. Some of these toilets make use of electro-coagulation to flocculate and remove oils, suspended solids, and heavy metals from domestic and industrial wastewaters. The electro-coagulation process utilizes a controlled electric current that is passed through wastewater, often from electrolytic plates, which in turn charges particles in the wastewater (including particles smaller than one micron) that coagulate. The coagulated particles flocculate to form a mass that either floats on the surface or settles to the bottom depending upon the nature of the compounds that have coagulated together. Once the flocculated particles are floating or have settled to the bottom, they may be removed. Electro-coagulation is an extremely effective and cost-efficient method for treating wastewater in that it does not require the use of chemicals, pathogens and other microorganisms are killed, most contaminants are removed from the wastewater, and the operating costs are low.

U.S. Pat. No. 6,719,894, issued Apr. 13, 2004 to Gavrel, et al., describes a process for the electro-coagulation of waste fluids. Pressurized wastewater is passed between charged electrolytic plates to form precipitate particles of organics, particulates, and metal contaminants. The water and particulates then pass from the reactor vessel into a floatation chamber where dissolved gases cause the precipitate particles to float to the surface for removal to create a clarified waste water.

U.S. Pat. No. 6,746,593, issued Jun. 8, 2004 to Herbst, describes a high volume electrolytic water treatment system and process for treating wastewater. In that invention, solids are removed from the wastewater which is then passed into a tank containing electro-coagulation electrodes that destabilize materials such as fats, oils, greases, and surfactants. Electro-coagulation of the wastewater causes contaminants to flocculate and float to the surface. The foam and floating sludge is removed by a foam removal apparatus and the clarified water is discharged after passing over an effluent weir and out of a clear water discharge tube.

U.S. Pat. No. 4,209,389, issued Jun. 24, 1980 to Hartkorn, describes a method using bacteria for removing pathogenic microbes and dissolved organic contaminants from wastewater liquids. The first stage of the described process involves removing substantially all colloidal materials using electro-coagulation. Thereafter, specifically chosen microorganisms are added to the wastewater to remove the remaining organic contaminants.

U.S. Pat. No. 4,999,930, issued Mar. 19, 1991 to Kishi, et al., shows a device that dries raw sewage. This system uses a plurality of beat balls which are paddled around to provide some dehydration of sewage. The system requires an inefficient array of chemical elements in an attempt to dehydrate waste materials.

U.S. Pat. No. 5,152,074, issued Aug. 6, 1992 also to Kishi, et al., shows a similar device that utilizes conductive heating as the heating elements.

U.S. Pat. No. 5,218,724, issued Jun. 15, 1993 to Blankenship, shows an incinerator toilet with a removable catalyst container. One of the drawbacks of this device is that it uses pellets for reducing odor which are inserted and removed for replacement.

U.S. Pat. No. 5,276,924, issued to Hachima on Jan. 11, 1994, shows a method and apparatus for disposing of body waste that includes inductive heating.

U.S. Pat. No. 6,101,638, issued to Hammond on Aug. 15, 2000, shows a toilet that utilizes air pressure, grinding and heat to produce a dry powder waste. A second patent, U.S. Pat. No. 6,496,988 issued to Hammond on Dec. 24, 2002, shows a compact recycling electric dehydration toilet. While both of these patents describe a useful method and system for treating human waste that is self-contained, it is believed the energy consumption is higher than desirable especially in mobile and self-contained environments.

Water, the most essential element to human life, is one of the largest natural resources polluted with human waste. In the industrialized countries, each toilet flush uses between four to seven gallons of water except where the 1.6 gallon flush toilets have been mandated. On average a typical household uses over 40,000 gallons of water each year just to flush their toilet. Lakes and oceans are being inundated with large volumes of partially and, sometimes not, treated human waste that has polluted many areas of the world. Problems with portable toilets typically include consumption of large amounts of energy in boiling water over a small surface area and failure to break down body fats inherent in human feces that can be thirty percent or more oils and fats preventing a true dry dehydrated powder as the residue. The amount of electrical power drawn per flush in some portable toilets is high—in some cases in excess of 3 KW per flush. The present invention described herein overcomes the above problems by providing an energy efficient way to dehydrate and sanitize human waste.

In addition to the consumption and subsequent pollution of water supplies inherent with using traditional toilets and the inefficiencies with respect to moving human wastes, there is also a large amount of gray water created from all types of washing that makes the water unsuitable for human consumption. Gray water contains detergents and other wastes, such as those found in wastewater from car washes, washing machine discharge, showers and sinks. The large volume of gray water is also a critical item in portability as it relates to the consumption and post-processing of water in vehicles such as boats and recreational vehicles as well as in stationary applications such as residential, commercial and industrial structures. Certain areas of the United States have chronic water supply problems and drought that requires a very controlled use of water volume. Developing nations have communities that have water shortages and a lack of sanitary sewer systems that result in disease and death.

The present invention overcomes many of the problems that have been found in stationary or portable toilets and in the overall problems addressing gray water and its recovery for reuse.

SUMMARY OF THE INVENTION

A method and system for a portable self-contained dehydration engine used in a single self-contained toilet, with multiple toilets connected to a remotely installed dehydration engine, and/or with an entire gray water recovery system comprising a dehydration chamber which can also be installed in a toilet, an electro-coagulation reaction chamber, a separation/sterilization chamber, a water holding tank/flush tank and one or more toilets, a power supply, a circuit board, and power supply. The dehydration chamber can reduce human solid waste to a safe dry powder and dehydrate coagulants from the gray water recovery system using heat and evaporation. The dry powder is sucked into a vacuum bag for disposal in household trash.

The method and system can be used in residential, commercial, or industrial structures and on a mobile platform such as a truck, recreation vehicle, car, ship, boat, trailers, rail cars, or aircraft. The method and system can be used to retrofit existing sanitary systems that utilize septic tanks or holding tanks serving multiple traditional flush toilets and gray water inputs. The invention eliminates the need to move or flush human waste with drinking water and eliminates the discharge of human waste into sewage pipes or septic drain fields. The discharge from the invention is water suitable for reuse and a dry sanitized powder suitable for disposal in the household trash. The dehydration engine itself is versatile enough to be used in any application needing to dehydrate liquids, reduce liquids, process slurries into food, desalinate water, or other such industrial applications. Many solvents used in industrial applications can be processed and neutralized using the combined gray water system and dehydration engine.

The dehydration chamber that treats human waste is constructed of one or more (preferably two) cylinders mounted side-by-side each of which contains helically-shaped blades, modified augers, or paddles that extend approximately the length of each cylinder. The advantage of side-by-side cylinders is to increase the heated surface-to-volume ratio to which the content is exposed. Each helical blade is connected to a shaft at its center. A motor drives both helical blades directly, using gears, belts, a worm gear, or chain. The cylinders or the blades may contain electrical heating elements that bring the internal parts of the cylinders to a predetermined temperature. The helical blades (one for each cylinder) act on the waste materials during rotation to form a slurry of liquid and solid waste materials due to the rotational action of the blades shredding the solids against a sheer wall in the cylinders. The blades also lift the slurry up against the heated surfaces forming a thin film of slurry that evaporates more rapidly.

By using cylinders, more can be added easily side-by-side in order to maximize capacity and the surface area-to-volume ratios on which the slurry is exposed, thus greatly increasing the efficiency of energy consumption. Periodically, the slurry is heated to 350 degrees Fahrenheit within the dehydration chamber reducing the waste materials to a dry powder. The evaporate or steam is vented to the outside from the dehydration chamber. The steam is recovered for the next flush or is sent to the gray water recovery system. Each of the cylindrical dehydration tubes or cylinders includes a plurality of electrical heating rods (resistance heating) that are mounted on the exterior periphery longitudinally to each cylinder or is made an internal part of the casting or extrusion. Alternatively, the stirring paddles may contain the heating elements. The heating rods are connected to an electrical power source that can be battery powered (DC) or used with conventional alternating current (AC). A circuit board and software controls the time and amount of electricity fed to the heating rods commutating the electric current and maximizing the energy efficiency of the dehydration engine. This minimizes the amount of electrical current drawn as the maximum temperature inside the dehydration chamber is maintained to evaporate liquid waste. This action provides for the most efficient use of electrical energy to evaporate the liquids as the solids in the chamber are reduced to a dry powder. The heating system may or may not be turned on after each use of the toilet or each flush. The heating and "cooking" of the waste slurry can be programmed for once a day or even once a week depending on the usage of the dehydration engine. Alternately, during heavy use the system may stay on until the toilet determines that regular use has resumed. A predetermined number of uses with the toilet could be counted in order to save electrical energy. The heating of the dehydration chamber involves temperatures between 250 to 350 degrees Fahrenheit range. An exhaust fan is turned on during the heating process and the dehydration chamber is vented to allow the steam to vent either to the outside ambient air or to be recovered. Sensors shut the system down if the engine temperature exceeds 355 degrees Fahrenheit or if temperature of the cabinet covers exceeds 150 degrees Fahrenheit.

Connected between the toilet bowl and the dehydration chamber is a manually or automatically activated electric dump valve that is designed to allow the human waste in the toilet bowl to be flushed and drawn into the dehydration chamber. This operation is enhanced by an in-line exhaust fan connected to the vent. The electric dump valve is sealed closed during the heating process which also allows the steam to exit the vent and prevents steam and odors from exiting into the toilet bowl or into the bathroom area. For safety, the dehydration engine will not start until the toilet seat is in the down position.

The dehydration cylinders are insulated with an insulation material such as a space blanket or with an insulating ceramic coating to reflect heat back towards the chamber. Ceramic insulation encircles the blanket or coating holding in more heat. The insulating ceramic coatings also reduce the chances of electrical shocks.

The dehydration chamber is watertight and safe around water. The electrical aspects of the unit are equipped with a ground fault protection. The dehydration chamber can be used to accept multiple toilet designs from various different manufacturers. The best models will use low water volume with high pressure jets designed specifically for this application. This reduces the amount of water to be dehydrated and reduces energy costs. A proprietary toilet design is also incorporated in this invention that uses high pressure, low volume spray jets to clean the bowl. The reason for using the proprietary toilet is that the less water used to flush translates to less electrical energy needed to dehydrate.

The self contained dehydration toilet system includes a small water holding tank (3 gallons) whereby ozone is injected to keep the water sanitary for use in flushing the bowl. Ozone acts to sterilize the waste and reduce exhaust odor. The steam vent line from the chamber vents to ambient air and the condensate within the pipe can be returned back to the holding tank for use in the flush.

Ozone is introduced into the dehydration chamber to break down body fats found in feces and to enhance the sterilization process. Another byproduct of the use of ozone is the elimination of all odors during "cooking" of the waste. The introduction of ozone not only oxidizes the solids and liquids found in the human waste but actually initiates the evaporation process without the use of excessive electricity or heating elements. One-half gallon of liquids can be evaporated over a few days with minimal energy usage. Ozone is introduced into the flush water holding tank in order to keep the flush water sanitized.

Air is drawn into the cylinders for two purposes. First, air is drawn into the cylinders during the vacuum cycle to evacuate the dry powdered wastes out of the cylinders. Second, air is drawn into the cylinders to draw preheated air into the chamber to speed the drying process during a regular cook cycle cool-down.

The self-contained dehydration engine is comprised of the holding tank, the dehydration chamber, the heating elements and power control circuit board and software program, the steam vent, the flush valve, air pumps, ozone generators, air intakes, one or more toilets and toilet bowls with dump valves and steam valves, a vacuum, exhaust fan and a recovery area such as a bag to collect the solid waste particles once they have been dehydrated. This basic dehydration unit can be connected in such a way to provide multiple toilet facilities as an overall system that can be used in a mobile environment such as aboard ship, for land vehicles for use in the military because of its portability, aircraft or even residential, commercial, and industrial uses with multiple toilets.

The dehydration chamber as a dehydration engine can be employed in an overall system that not only increases the efficiency of safely disposing of human waste and greatly reducing fresh water and energy consumption, but also can be combined with a method and system for treating and recovering gray water as well. Gray water is water that has been used for cleaning and washing purposes such as wastewater from showers, sinks and other types of cleaning operations including buildings, vehicles and the like. Typically, gray water contains not only dirt but also solvents and other types of soaps, soap residues and other chemicals. In our case, we include human urine to the mixture because treating the urine in this gray water system is far more cost effective and quicker than dehydrating it. The fresh water recovery combines the dehydration engines in the toilets or mounted without a toilet, and the use of electro-coagulation and the proprietary design of our combined separation/sanitation tanks. The center of the system is based on a separation/sanitation tank that incorporates the use of ozone and ultraviolet lights. Water is collected from sinks, showers, dishwashers, urinals, and other types of drains for air conditioners. The gray water is put through a filter screen, a sump, and treated with a proprietary disposable electro-coagulation reaction chamber before entering the separation/sanitation tank. Within the separation chamber the majority of the coagulants float to the water surface and fall into the dehydration chambers. The treated gray water with the removed solids is then ozonated and treated with UV lights then transferred into a holding tank and reused again for showers, boat wash, toilet flush and dishwashers. A certain amount of this water can be treated and further sterilized to provide drinking water in a separate holding tank. The separation/sanitation tank that has the treated gray water could also be connected through a dump valve to the dehydration engine that itself serves several input toilets. Within the separation/sanitation tank nearly everything that is not water is turned into foam and floats to the surface. The foam is skimmed from the surface and is directed to a dehydration chamber. Most important is that multiple traditional toilets along with all gray water can be flowed to a single holding tank and the liquids can be pumped out and treated in this same gray water system. Traditional methods of using microbes that digest the solids turning them into liquids would also be employed. The output of the dehydration engine would be a vacuum unit that removes the solid dehydrated waste particles from the dehydration engine. The dehydration engine treats not only human waste but also the residue waste from the electro-coagulation used in the gray water treatment.

Thus, in one overall self-contained system and method, human waste can be successfully treated using minimal energy while, at the same time, large amounts of gray water can be successfully recovered for reuse with low energy usage and no chemical input (with the exception of ozone). Electro-coagulation has been used to treat water for many years but until now has not been a viable process due to the extremely large amount of coagulants (foam) produced during the process. In many cases the coagulants may not be sanitary or acceptable for disposal in landfills. This system allows with a minimal amount of maintenance for the safe disposal of the sanitized coagulants.

It is an object of this invention combined and separately to provide an improved modular and versatile self-contained method and system for efficiently treating human waste using the least amount of water possible, to sanitize and recover gray water for reuse, and to minimize the energy used.

It is another object of this invention to provide a portable dehydration engine that can successfully treat human waste efficiently and be incorporated into a single self-contained toilet or a multiple toilet system that is mobile or stationary and useful not only for residential, commercial, or industrial applications, but also in a mobile environment such as boats, ships, aircraft, and land vehicles.

Another object of this invention is to provide a modular portable or stationary toilet and gray water system that can successfully treat human waste, eliminate odors, and reduce human waste to a powder for easy disposal.

Still another object of this invention is to provide an overall self-contained modular system and method for treating human waste and gray water that can integrate these different functions into a mobile or stationery, highly efficient system that results in recovery of water and great reduction in the use of water and energy in treating human waste.

In accordance with these and other objects which will become apparent hereinafter, the instant invention will now be described with particular reference to the accompanying drawings.

PREFERRED EMBODIMENT OF THE INVENTION

Figure 1:
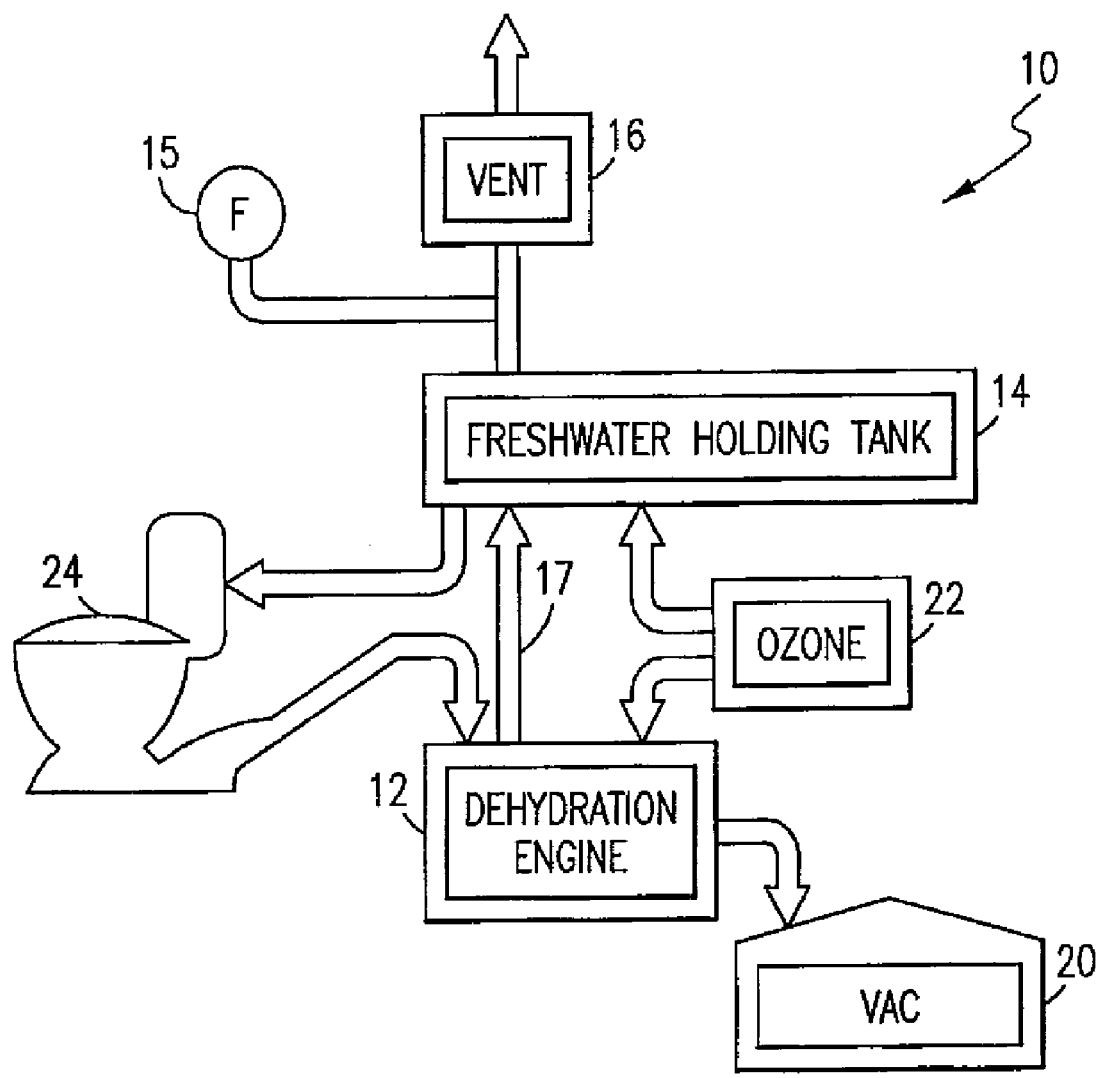
FIG. 1 shows a schematic block diagram of the present invention for the self-contained mobile or stationary dehydration toilet using the dehydration engine.

Referring now to the drawings and, in particular, to FIG. 1, the present invention is shown generally at 10 schematically in a block diagram form that includes a dehydration engine 12 that has an input from toilet or toilets 24 In a single toilet embodiment a toilet 24 could be connected directly as an input to the dehydration engine. The dehydration engine 12 is also connected by steam conduit 17 to a fresh water holding tank 14 as an output, an exhaust fan 15, and a steam vent 16 that is also connected into the fresh water holding tank 14 for recovery of condensate water resulting from the cooled steam. An ozone source 22 is also provided into the dehydration engine for sterilization and reduction of odors. The process is complete when the solid waste is heated so that the liquids evaporate resulting in a residue in the form of a dry powder that has been sanitized and remains in the dehydration engine 12 until removed through the central vacuum or an internal vacuum 20 which may include a bag for recovery and later disposal by applying a vacuum to the dehydration engine, thereby sucking the powder into a storage bag which can be removed. Ozone 22 can be applied along with stirring to evaporate a majority of the liquids before the heating begins, thereby reducing the energy requirements and the time for final dehydration.

Figure 2:
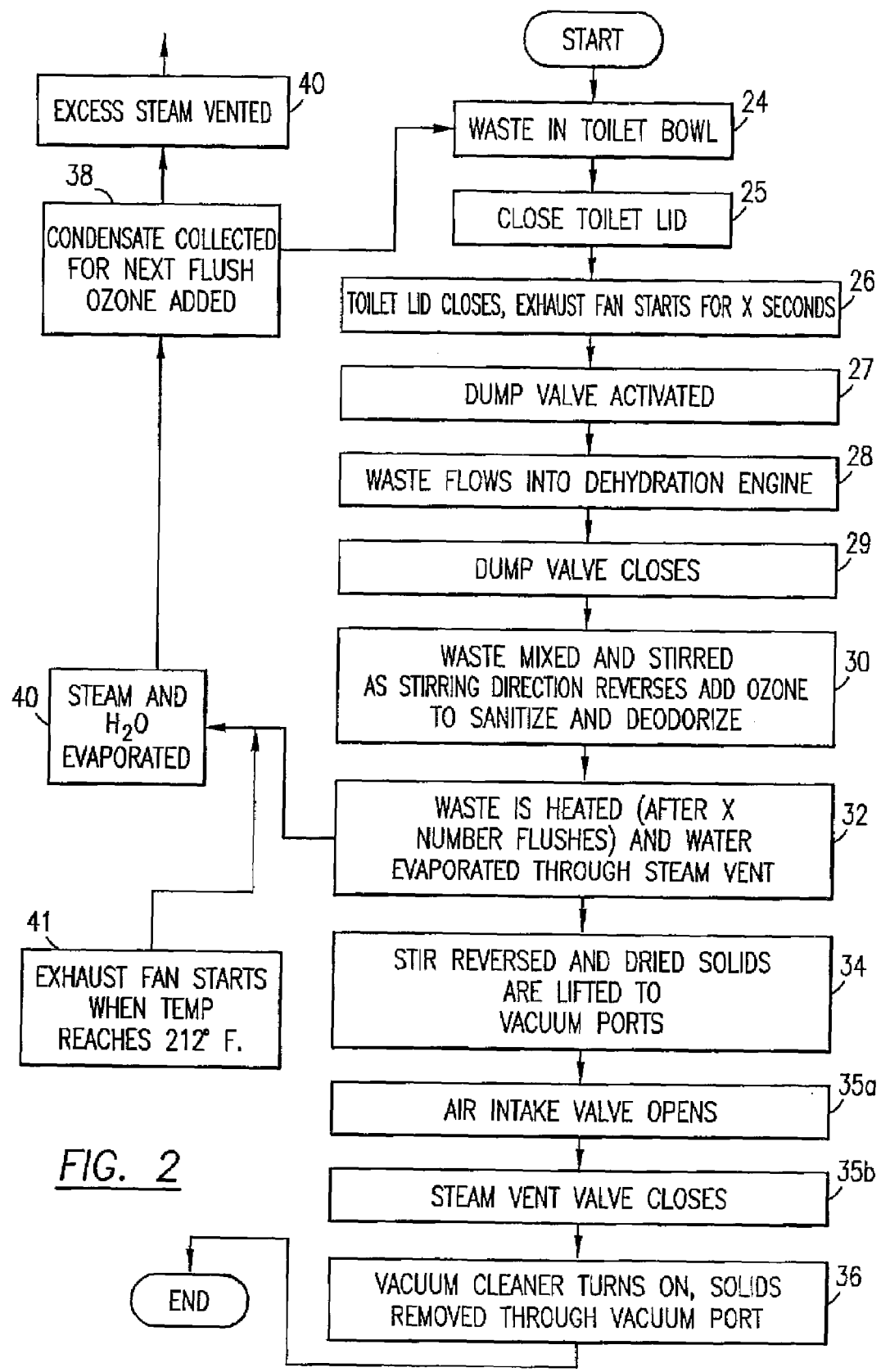
FIG. 2 shows a flow chart of the operation of the dehydration engine and toilet in accordance with the present invention.

Referring now to FIG. 2, the method employed in the present invention is shown which includes the operation for a single toilet. At the start, waste is put into the toilet bowl. The dump valve 26 is activated when the toilet lid 25 is closed or the manual override is activated. Ozone and water from the holding tank 38 is placed into the toilet bowl to flush the toilet and the exhaust fall 41 starts for (x) seconds. Waste then flows into the dehydration chamber in step 28. The dump valve then closes at 29 sealing the dehydration chamber.

Within the dehydration chamber, the waste is mixed and stirred with rotating helical blades that create slurry. Ozone is applied periodically 30. The helical blades can be rotated in two separate directions based on the motor and gear directions (belt drive, worm drive gears, or chain drives may apply). After step 30 is completed, then the entire dehydration chamber is heated after a predetermined number of flushes causing the slurry to change to steam that is evacuated through a steam vent 40. Cooled steam turns to condensate within the vent 16 and is collected in a holding tank where ozone is periodically added 38. The water in the holding tank is then used for the next flush.

The remaining waste that is now dried (with the liquids removed) is subjugated to reversal of the helix blades which forces the solid powder to the opposite end of the dehydration chamber. A vacuum system gets ready to turn on in step 35c. An air intake valve opens at 35a, the vacuum port opens, and the steam vent valve closes at 35b. Finally, in step 36, the vacuum cleaner turns on and the solids are removed through the vacuum port into a bag and safely transported.

When looking at FIG. 2, there are several important system activities that greatly enhance the efficiency of this operation for storage and changing of human waste into a powdered residue. The use of ozone in step 30 reduces odors and helps sterilize the waste product as well as uses the air flow to begin low energy evaporation of the liquids. Also, during the heating operation, which is controlled by a computer program, the electrical energy used in the heating elements in step 32 in FIG. 2 is done in such a way as to maximize the efficiency of the overall unit by controlling the power and time of energy to the heating units for maximum efficiency.

Figure 3:
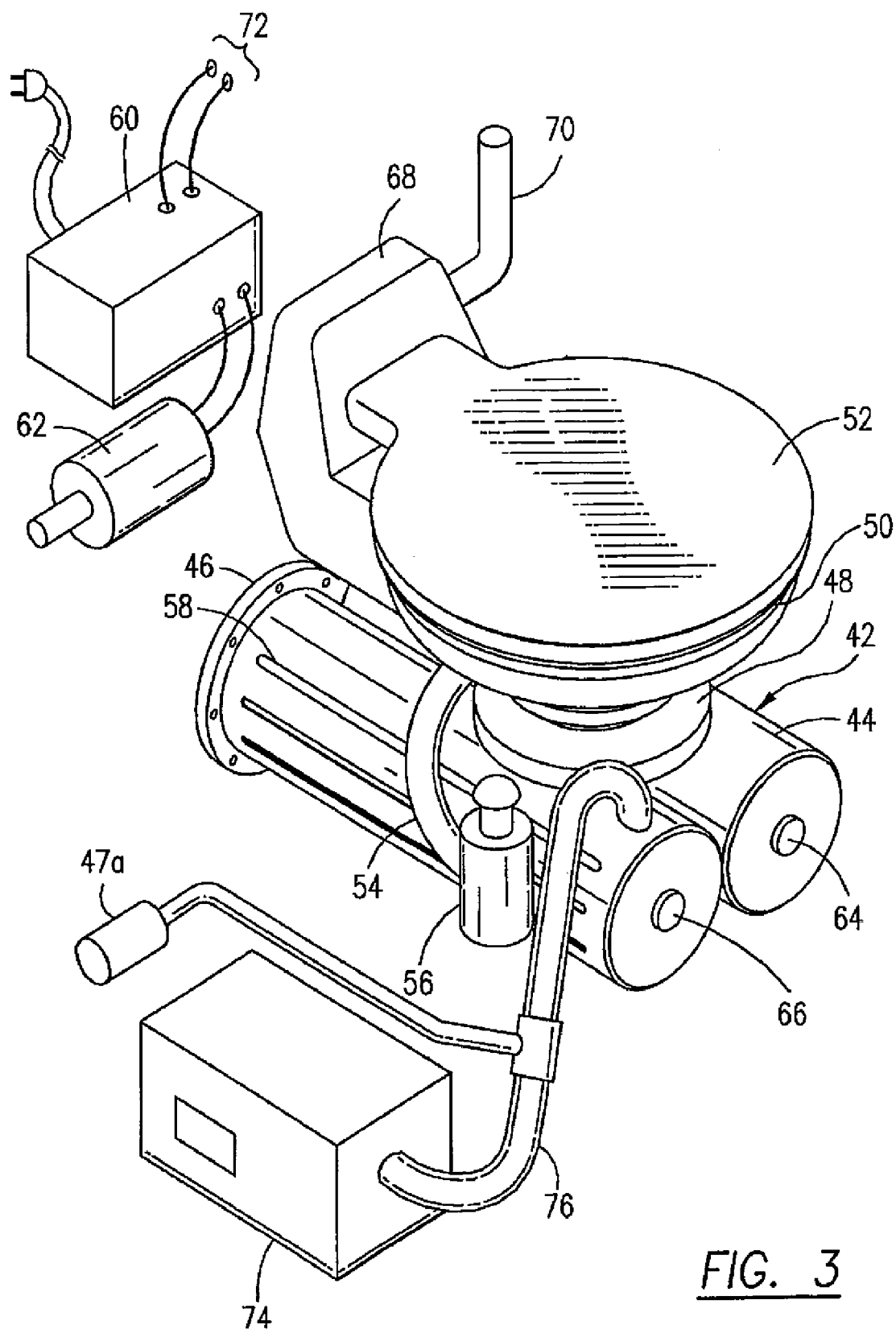
FIG. 3 shows a perspective view of the dehydration engine and toilet in accordance with the present invention with the dehydration engine cabinet and insulation removed.
Figure 4:
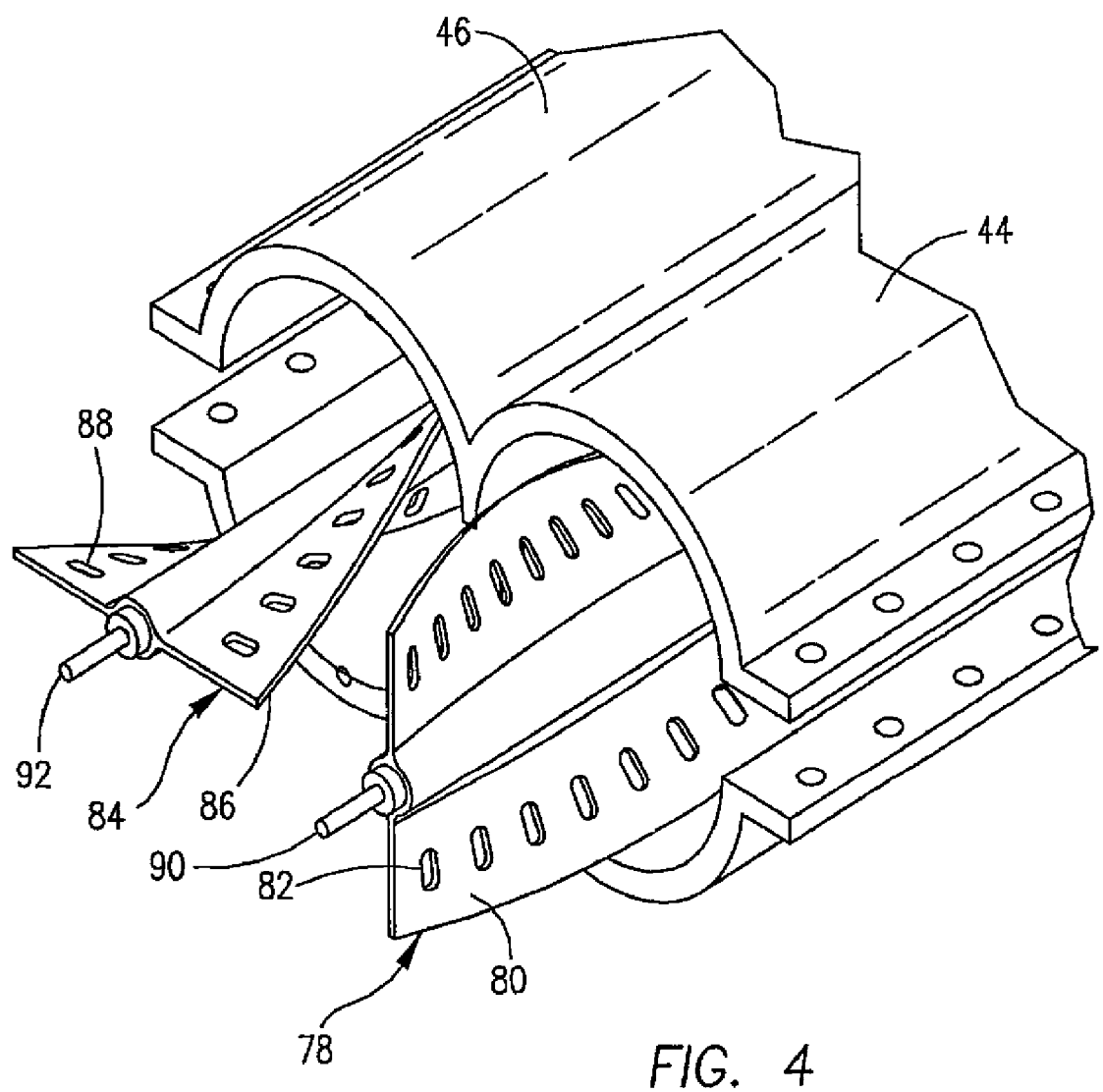
FIG. 4 shows a perspective view of the cylinders used in the dehydration engine in phantom with the helix blades remembering that modified augers, or other types of paddles can be used. Cylinders can be cast as two parts and bolted together or extruded and welded, or made out of plastic with the heating elements made part of the helix.

Referring now to FIG. 3, the self-contained dehydration chamber is shown with the overall cabinet removed and the insulation removed. The heart of the system is the dehydration engine 42 that is comprised of two aluminum or stainless steel cylinders 44 and 46 that are mounted side by side and that have common openings in the top where it is connected to a flush bowl 50 through a sealing ring and flush valve 48. In some cases it is cheaper and as efficient to use only one cylinder depending on the capacity desired. The dehydration chamber can be constructed in a molded or cast upper half as a composite plastic or aluminum and a lower bottom half of cast aluminum with a plastic insulating cover. The halves are mechanically connected together and sealed. The toilet bowl has a toilet lid 52 attached thereto. Contacts in the toilet seat can turn on and off the system. The water and ozone holding tank 68 is shown adjacent to the toilet bowl and is connected directly into the flush bowl 50 upon an activation of a handle 70 that manually provides water to be dumped under pressure into the flush bowl 50. Alternatively, the contacts in the lid 52 can begin the flush cycle. A steam vent is connected into the dehydration chamber 42 through tube 54 that includes an exhaust fan 56 shown schematically. Referring also to FIG. 4, inside each cylindrical chamber 44 and 46 are helix blades 78 and 84 that are longitudinally disposed within the cylinders 44 and 46 that are connected to a motor 62 that provides rotation of the helix blades moving them in a first direction and then a second direction. The purpose of the blades is to separate solid materials from liquids to expedite evaporation through heating of conductive heating elements 58. A series of elongated electrical heating elements such as 58 are mounted around the periphery of both of the cylinders 44 and 46 that at predetermined times are activated by a controller 60 that controls the motor 62 and heating outlets 72 that are connected to each of the heating elements 58 on the chamber outside walls. Using a control program, the electrical power provided to the heating elements 58 is controlled after a sequence of flushes for efficiency and based on temperature sensing in order to provide the most efficient boiling or heating of the liquids for evaporation purposes. The steam vent tube 54 may also be connected into the holding tank 68 to return sterilized or distilled water to the holding tank 68.

The powder residue, after moisture has been evaporated through the cooking and heating process, would be removed by a vacuum system 74 that creates a vacuum and that contains a bag to collect the powdered residue that is drawn from the dehydration cylinders 44 and 46 through a tube 76, The bag can be removed from the vacuum unit 74 and the residue safely disposed of since it has been somewhat sterilized by the ozone treatment.

To use the present system as is shown in FIG. 3 as a singular toilet, the manual handle 70, which may also be automatic or electrically operated, is used to flush waste in the flush bowl 50 with water and ozone from the small holding tank 68 which also opens the electric flush tank valve 48 allowing the waste materials to be received into both cylinders 44 and 46 simultaneously. The flush tank valve 48 then closes sealing the entire dehydration chamber 42. After a predetermined number of flushes, the power controller 60 which connects to a power source through plug and electric wire 60a will cause heating elements 58 to be heated for a predetermined amount of time and temperature. Meanwhile, between flushes, the motor 62 is activated which causes the helical blades inside each cylinder 44 and 46 to rotate in a first direction to create a slurry which can then be much easier to evaporate. Ozone is also added at this time. At pre-selected times, preferably at night when the toilet is not in use, the chamber can be heated, evaporating all liquids and forming a powder residue of the remaining solid waste materials. It is during this cycle that the powder residue can be removed by the vacuum unit 74 through tube 76 cleaning out the entire unit. Steam and other liquids that evaporate can be evaporated through vent 56 from tube 54 during the cooking process. The motor 62 is periodically activated by the controller 60 to cause the blades to move in one direction during the separation process and the residue can be forced in a reverse direction by reversing the motor 62 causing the blades to go in the other direction to add ozone to sterilize and deodorize and to allow the solid waste material once in a powder form to be in a better position in the cylinders 44 and 46 for removal by the vacuum 74.

The controller for the electrical power 60 includes a software program or processor that can determine by temperature sensing and time the most efficient power curve for the heating elements 58 as to on-time and off-time based on temperatures and other factors to get the most efficient use of the electrical energy. Finally, the liquids can also help to replenish water into the holding tank 68 by providing distilled water in the form of condensed steam that can be returned to holding tank 68.

FIG. 4 shows cylinders 44 and 46 which are aluminum or stainless steel thermally conductive metal and very rigid that form the basis of the dehydration engine 42.

Referring now to FIG. 4, the two joined cylinders 44 and 46 are shown that contain plastic blades 78 and 84 that are helical in shape and that are sized in length to fit within the length of each cylinder 44 and 46. Each blade includes a blade member 80 having apertures 82 throughout to allow liquid to pass through. Blade 84 includes a helical blade member 86 having plurality of apertures 88 throughout. Blade 78 includes a drive shaft 90 that connects to the motor shown in FIG. 3. The shaft can be driven by a direct worm drive powered by the motor. Also, drive shaft 92 of blade 84 connects to the motor 62. The motor can propel the blades rotationally in the same direction during one phase of the operation which forms the basis for creating slurry. When the heating elements 58 are heated, this heating causes the cylinders to heat up and the liquid inside to heat until the point where the liquids actually evaporate or are boiled. Once the liquids are evaporated through the vent, then the remaining waste solids are continually heated until the waste materials form a powder. At that point, the blades can be reversed in direction while ozone is added to sterilize and deodorize so that the residual powder is moved towards a point in each cylinder where a vacuum system will remove the powder waste products safely and efficiently. The blades themselves are made of a plastic and are attached to the drive shafts 90 and 92. The blade paddles are helical in shape.

The dehydration engine has been shown and used with a single self-contained toilet and can be connected to a system of multiple toilets for taking and removing human waste with very little water and forming a dried powder as shown in FIGS. 1 through 5.

Figure 5:
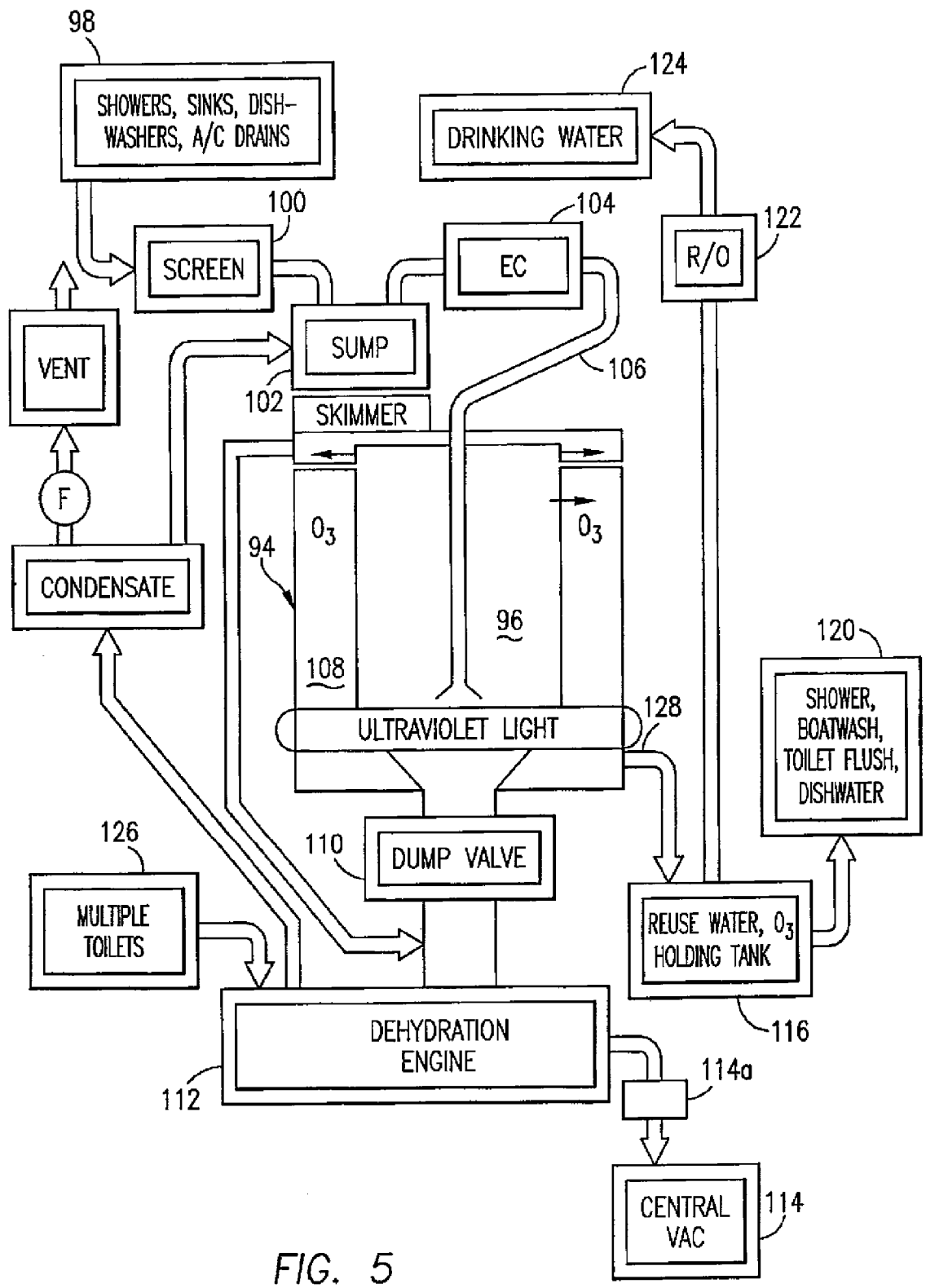
FIG. 5 shows a schematic block diagram of the gray water recovery system used with the dehydration engine in the present invention. Toilet or toilets may be added if desired.

FIG. 5 shows a large system that includes gray water recovery and human waste disposal while at the same time having a series of multiple toilets all of which can be done in a portable system. The heart of the gray water system is a separation tank 96, a dehydration chamber and an electro-coagulant unit which is encompassed with a source of ozone in tank 108. The gray water is recovered from showers, sinks or drains represented at 98 which have a filter or screen 100 to remove larger particles. A sump 102 is used to collect water to be processed which is then sent through a reaction chamber 104 where electro-coagulation takes place as a treatment of the gray water. The treated gray water is then transmitted into the separation tank 96 through conduit 106. At this point, the coagulants separate from the fats in the water. In addition, the water is treated with ozone to enhance sanitation. The arrows at the top of the separation tank indicate the runoff of the undesirable portions. A dump valve is provided wherein the coagulant can be put directly into the dehydration engine for the toilet system which includes multiple toilets 126 connected into the dehydration engine 112. Further use of that water includes additional treatment at 122 to provide safe sterilized drinking water in a tank 124. Also, the reused water in the holding tank 116 can go back to be used for showers, boat washes, toilet flushes and dishwater as represented by tank 120. The electro-coagulation treatment of water is known as shown in Box 104.

The system shown in FIG. 5 can be stationary or mobile for use in houses, commercial buildings, boats, and airplanes. Because of its small size and low power consumption, the system can be used on a large 18 wheel truck or towable trailer and each element can be scaled to size depending on the usage. For example, a portable vehicle having showers, sinks, drains and even air conditioning drains would be mounted on a trailer bed that also includes multiple toilets. The entire system can be mobile, use very little water, recover gray water and dispose of human waste with minimal power usage. Discharge from this vehicle would be excess sanitized water available for other uses.

Figure 6:
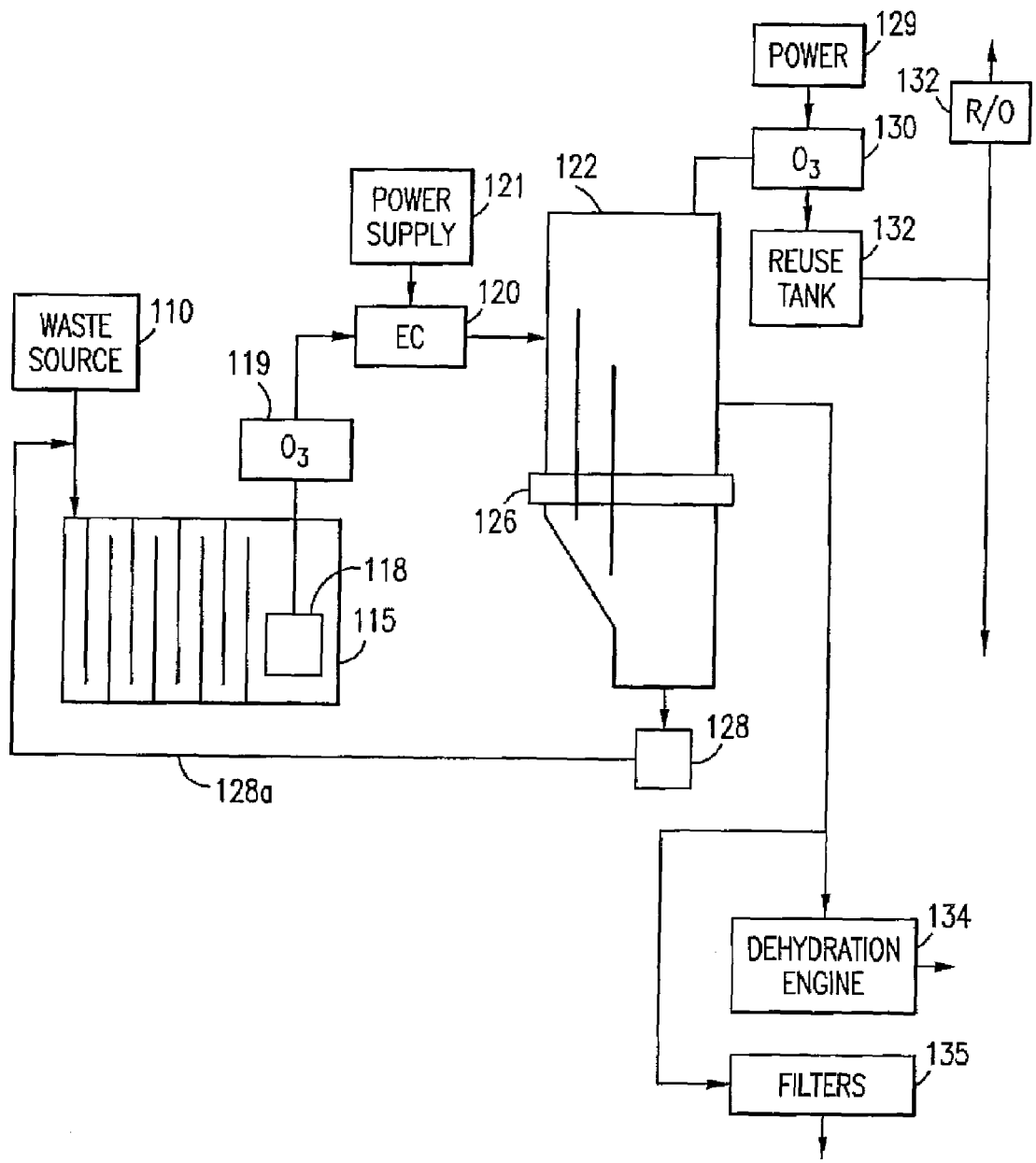
FIG. 6 shows a schematic diagram of the gray water system used to treat all gray and black water collected from a bio-reaction chamber or traditional septic tank.

The system shown in FIG. 6 is a system to be used with a holding tank, septic tank, or a specially designed bio-digestion chamber. Multiple toilets, sinks, urinals, and gray water sources 10 drain into the bio-reaction chamber 115 or existing septic tank, or holding tanks in boats, air planes, motor coaches, 115. A sump pump 118 draws the effluent from the tank 115 and forces effluent through the disposable electro-coagulation reaction chamber 120. Ozone is added at element 119. The effluent then moves into the separation/sanitation tank 122 where almost everything that is not water is turned into a coagulant that either floats or sinks. The coagulants are then directed to either a dehydration engine 134 or passed through filters 135. The cleaned water is ozonated from source 130 and exposed to ultraviolet lights 126 then directed to a holding tank 132 for reuse. Coagulants that settle to the bottom of the tank are dumped back into the bio-reaction chamber 15 for subsequent processing by microbes.

Figure 7:
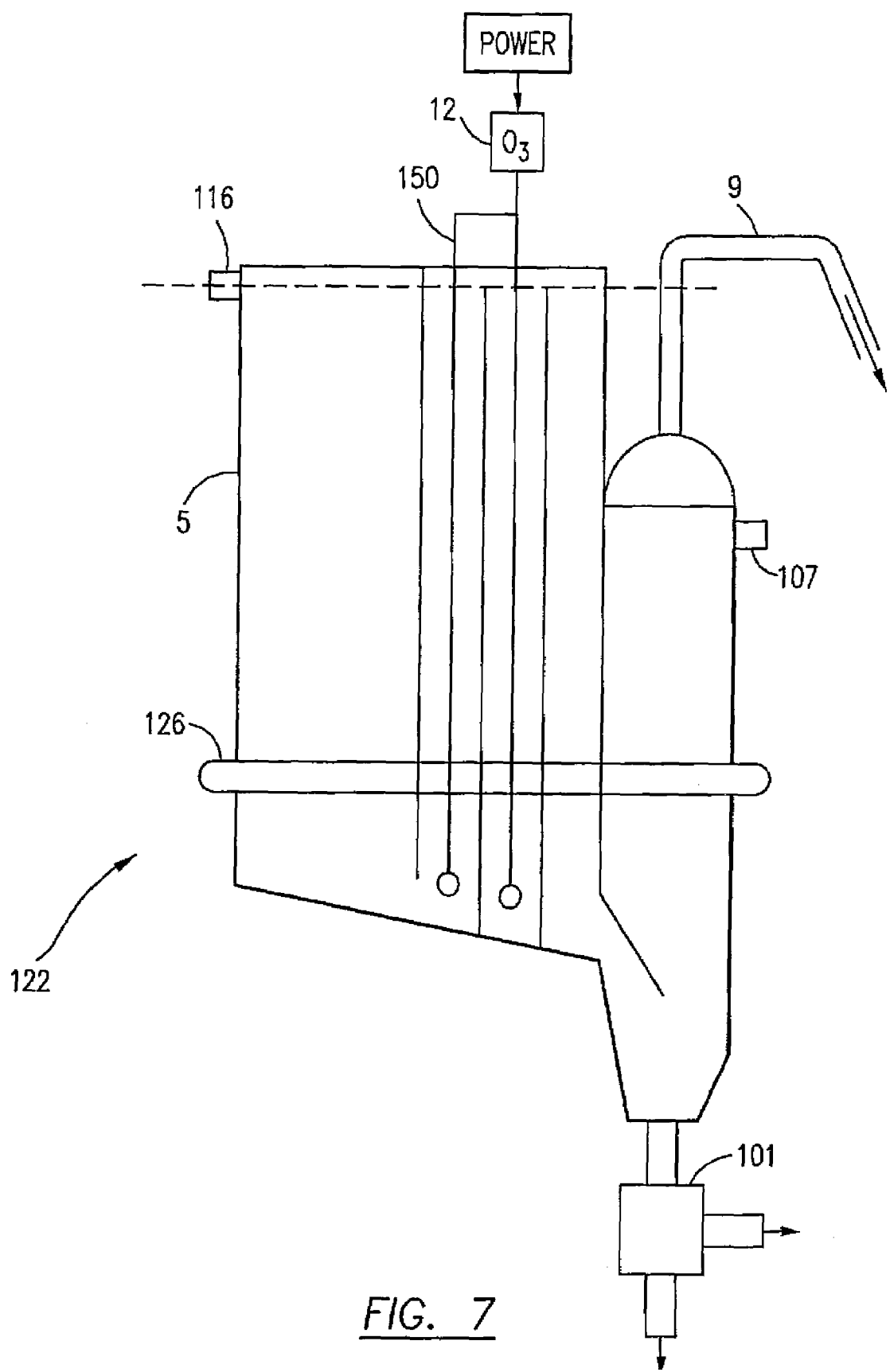
FIG. 7 shows a side elevational view of the separation/sanitation tank.

The system shown in FIG. 7 is the separation/sanitation tank 122. Effluent from the electro-coagulation reaction chamber 120 (FIG. 6) enters the tank 122 from the input portal 107. At this point water separates from all solids and bacteria, which turns into a coagulant and either floats and empties through the skimmer 109 or sinks and returns to a bio-reaction chamber or holding tank 115 through an automatic or manual dump valve 101. Baffles 150 in the tank 122 serve to keep the water level contained in the tank, divert the flow causing the water to be exposed to ozone 120 and ultraviolet light 130 for a longer period of time, and prevent the water from sloshing around when mobile. The water is discharged from exit portal 116.

Figure 8:
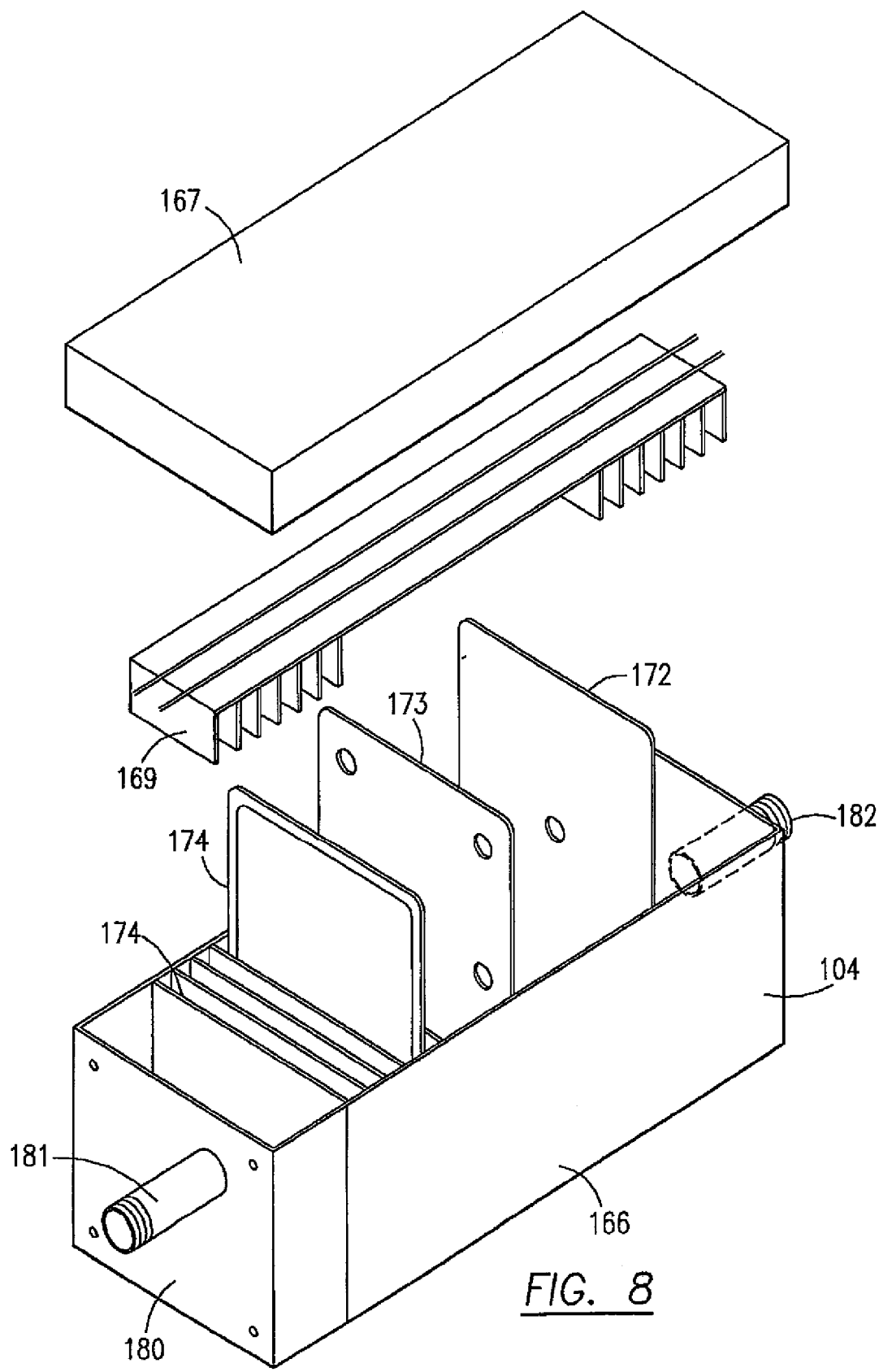
FIG. 8 shows an exploded view of tile disposable electro-coagulation reaction chamber.

The system shown in FIG. 8 is the electro-coagulation reaction chamber 104 with disposable metal plates and gaskets. The system consists of the pressure box 166, lid 167, power strip 169, metal plate with one centered hole 172, one metal plate 173 with four holes at each corner, a gasket 174, an intake 182 and a discharge 181, and a pressure plate 180 which causes the internal gaskets 174 and metal plates 173 to become water tight. Dirty water enters the intake 182. Gaskets 174 are placed between all surfaces, and metal plates 173 are alternately placed. The power strip 169 is connected to each metal plate 173 so as to cause every other plate to be positively charged or negatively charged. Dirty water is passed through all the plates alternatively subjected to positively or negatively charged particles; the reactive water is then discharged through port 181 after which the dirty water begins to coagulate. The metal plates 173 may be aluminum or iron or a combination of various other metals depending on the use or chemical composition of the wastewater.

The instant invention has been shown and described herein in what is considered to be the most practical and preferred embodiment. It is recognized, however, that departures may be made there from within the scope of the invention and that obvious modifications will occur to a person skilled in the art. The invention has been made modular to accommodate various applications and needs.

What is claimed is:

1. A system for reducing human body waste and other water contaminants to a dry powder that is safe for disposal and for filtering and clarifying contaminated water comprising:
    a dehydration engine for waste products;
    a self contained dehydration toilet having a flush bowl, a fresh water holding tank, a toilet lid, sensors on a seat of said flush bowl, and a source of ozone;
    a manual handle to release water from the holding tank;
    a dump valve, which connects said toilet flush bowl directly as an input to said dehydration engine, and which can be activated by manual operation of the manual handle to release water from the holding tank and ozone into the flush bowl so that its contents flow into the dehydration engine;
    said dehydration engine including a dehydration engine chamber having one or more cylindrical chambers mounted side-by-side having first and second openings in each top connected to said toilet flush bowl by said dump valve; said cylinders including one or more elongated electric heating elements mounted around the periphery of each cylinder for heating waste flushed from the toilet;
    a controller that is connected to each heating element on the outside walls of said cylinders and which activates said heating elements at predetermined times;
    a plastic helical blade disposed longitudinally within each of the cylinders for stirring the liquid, including a blade member having numerous apertures throughout to allow liquid to pass through and a blade shaft;
    a motor;
    said blade shafts being engaged with said motor connected to a power source which can rotate said helical blades in alternating directions within the chamber and which is activated by said controller for the heating elements;
    said controller for the electrical power to the heating elements includes a software program that determines by temperature sensing and time the most efficient power curve for the heating elements thereby activating said heating elements after a predetermined number of flushes to evaporate the slurry;
    a steam conduit connection to said cylinders;
    an exhaust fan connected to a power source and activated once the temperature within the dehydration engine reaches 212 degrees Fahrenheit, which is connected to said dehydration engine and also is connected by said steam conduit as an output to a freshwater holding tank so that steam is removed from said engine through a stream vent into said steam conduit to the freshwater holding tank as recovered condensate water; and
    a gray water recovery system having an electro-coagulation chamber comprising a source of power and an electro-coagulation chamber.

2. The invention according to claim 1, wherein the system can be installed in mobile platforms, such as boats, ships, planes, cars, trucks, portable toilets, and recreational or commercial vehicles.

3. The invention according to claim 1, wherein the system is designed to work with existing holding tanks and septic systems with minimal modifications.

4. The invention according to claim 1, wherein the system can be installed in a mobile trailer which contains multiple toilets, showers, and sinks that can be rapidly transported to disaster sites or used in the military as a rapid deployment vehicle giving troops sanitary facilities without adverse impacts to the environment.

5. The invention according to claim 1, wherein the system employs an electro-coagulation chamber, a separation/sterilization tank that uses ozone and ultra-violet radiation to further treat the water after the water has been electro-coagulated, and a skimming device that moves the coagulants from the said separation tank to the dehydration engine chamber to dry them into a powder suitable for disposal in household garbage.

6. The invention according to claim 1, wherein the electro-coagulation chamber is disposable, easy to change once the chamber becomes worn by usage, and which separates heavy metals, nutrients, cysts, bacteria, and various other natural contaminants from wastewater.

7. The invention according to claim 1, wherein the system is combined with a bio-reaction chamber where all toilets, sinks, showers, urinals, and other water-using fixtures and appliances, flow into the system so that all wastewater from a structure is treated and recycled as clean water and where wastewater in the bio-reaction chamber is processed with microbes as with traditional septic tank systems but without a drain field.

8. The invention according to claim 1, wherein each component of the invention, including the self contained toilets, the dehydration engine, and the electro-coagulation chamber, is designed to be modular so that each component or the combination of components can be ranged so as to meet the waste disposal needs of various applications in multiple industries, e.g. food preparation, as well as the treatment of gray water and human waste.

9. A method for removing human body waste and other water contaminants from water and reducing them to a dry powder form for safe disposal and for filtering, clarifying, and purifying gray water (or wastewater), comprising the steps of:
    a. placing the human waste into a toilet dehydration engine;
    b. in said dehydration engine, adding ozone to sterilize and deodorize the mixture of waste and gray water;
    c. heating the waste to a predetermined temperature with a temperature control member that controls energy; and
    d. generating a dry powder waste residue;
    e. removing the dry powder from the dehydration engine by a connected vacuum that sucks the powder into a storage bag which can be removed and discarded into household refuse; and f. directing gray wastewater to an electro-coagulation chamber having a power source to coagulate solid contaminants, including, among others, heavy metals, nutrients, cysts, and bacteria, into flocculated particulates that are thereafter allowed to settle to the bottom of a sump (separation/sterilization tank) and/or are skimmed from the water surface by a skimming device; where the clarified water is then released from into the dehydration engine to undergo the sterilizing process.

10. The method according to claim 9 wherein the water released from the electro-coagulation chamber is further treated and sterilized with a source of ultraviolet light and ozone released into the sump after the contaminants in the wastewater have been electro-coagulated.

11. The method according to claim 9, wherein the system is combined with a bio-reaction chamber where all toilets, sinks, showers, urinals, and other water-using fixtures and appliances, flow into the system so that all wastewater from a structure is treated and recycled as clean water and where wastewater treated in the bio-reaction chamber is processed with microbes as with traditional septic tank systems but without a drain field.

* * * * *